United States Patent [19]

Faulkner

[11] 4,023,201

[45] May 10, 1977

[54] INFRARED THERMOGRAPHY FOR DETERMINING EQUIPMENT TEMPERATURES IN OIL WELL FIRES

[75] Inventor: Kenneth F. Faulkner, Houston, Tex.

[73] Assignee: Infrared Surveys, Incorporated, Houston, Tex.

[22] Filed: Apr. 26, 1976

[21] Appl. No.: 680,420

[52] U.S. Cl. .............................. 358/113; 73/355 R; 169/69; 250/342

[51] Int. Cl.$^2$ ...................... A62C 3/04; H04N 7/18

[58] Field of Search ....................... 178/6.8, DIG. 8; 169/69; 73/154, 355 R, DIG. 7; 250/342

[56] References Cited

UNITED STATES PATENTS

| | | | |
|---|---|---|---|
| 1,351,700 | 8/1920 | Smith | 169/69 |
| 3,730,985 | 5/1973 | Whitney | 178/DIG. 8 |
| 3,761,713 | 9/1973 | Merrill | 73/154 |

*Primary Examiner*—Howard W. Britton
*Attorney, Agent, or Firm*—Sughrue, Rothwell, Mion, Zinn & Macpeak

[57] ABSTRACT

Infrared thermography is applied to the determination of the temperatures of equipment engulfed in an oil well fire. Operation is similar to a television camera in that the radiant flux from the scanner impinging on the infrared detector generates an electrical signal across the scanner. The amplitude of the signal varies according to the point-by-point temperature variation along the surface of the object that is being scanned by the camera. In this manner, a thermal picture display is generated by the signal produced by the scanning system. This produces a real time thermal image on the display screen. The thermal image is made stable, and hence usable in analyzing oil well fires, by the use of specially selected bandpass infrared filters.

5 Claims, 4 Drawing Figures

INFRARED THERMOGRAPHY FOR DETERMINING EQUIPMENT TEMPERATURES IN OIL WELL FIRES

BACKGROUND OF THE INVENTION

The present invention generally relates to infrared thermography and more specifically to the application of infrared thermography in determining equipment temperatures in oil well fires so that a fast and accurate determination of which well is flowing can be made. The present invention has particular application in the determination of temperatures of equipment engulfed in a fire on offshore oil well platforms but is not necessarily so limited.

In the past, when an oil well complex, such as an offshore oil well platform, becomes engulfed in a fire, the procedure for determining the source of fuel to the fire was primarily one of trial and error, resulting in the loss of several million gallons of crude oil, billions of cubic feet of natural gas and gas liquids during the days and even weeks that were required for the determination. An offshore oil well platform may be connected to upwards of 20 separate oil wells. If one or more of these oil wells catches on fire, there is equipment on the platform to automatically shut-off the fuel flow in all other wells. The problem then is to determine which well or wells are flowing so that the flow of fuel to the fire can be blocked. Once this determination has been made, the flow of fuel may be blocked, for example, by slant drilling into that well or wells and flooding with mud. However, neither this technique nor any other conventional technique for shutting off the flow in a well can be used until there is an accurate determination of which well or wells are involved.

In an effort to make a more accurate determination of which well is flowing in a fire engulfing an oil well complex, infrared photographs have been taken of the fire from several different positions around the fire. These photographs were then developed and carefully analyzed. This technique, however, has had only limited success. The problem is that the thermal image produced by a pure fuel is readily identifiable, but when other fuel components are burned in a mixture, the thermal image becomes distorted. The distortion introduced from the combustion of a non-homogeneous fuel prevents accurate interpretation of the thermal imagery.

The application of infrared thermography for determining temperatures of equipment engulfed in a fire on offshore oil well platforms is unique and novel. Prior to the present invention, no such application of infrared thermography has been effectuated. As in the use of infrared photographs, the principle problem associated with the use of infrared thermography is this application is that the thermal imagery is distorted thereby preventing an accurate interpretation of the imagery.

SUMMARY OF THE INVENTION

It is therefore a specific object of the present invention to provide a technique whereby infrared thermography can be applied for determinging temperatures of equipment in an oil well complex, such as an offshore oil well platform, engulfed in fire.

Another object of the invention is to provide a technique for producing a real time, stable thermal image on a display screen of equipment temperatures in oil well fires.

These and other objects of the invention are attained by a technique of filtering the thermal imagery. The equipment utilized in the practice of the invention comprises of an optical-mechanical scanner including a camera lens in combination with vertical and horizontal scanning prisms, columniation lenses, an infrared detector, an infrared filter system and a T.V. monitor. This equipment operates similar to a television camera in that the radiant flux from the scanner impringing on the infrared detector generates an electrical signal across the scanner. The amplitude of the signal varies according to the point-by-point temperature variation along the surface of the object that is being scanned by the camera. The resultant voltage signal is amplified by a video preamplifier of the direct-coupled type to retain the signal component which represents the absolute temperature level being sensed by the infrared detector. The amplified signal is used to modulate the intensity of the electron beam of a T.V. monitor unit wherein the electron beam sweep in synchronized with the scanning unit. This produces a real time thermal image on the display screen of the object being scanned. For this image to be usable in determining the source of fuel in an oil well fire situation, it is necessary that the image be stable. This is accomplished according to the invention by "stacking" a certain combination of bandpass infrared filters in the optical path preceding the infrared detector. In the image produced according to this technique, those pipes in which fuel is flowing are readily distinguished from other pipes and equipment in which the flow of fuel has been automatically shut-off. Due to the flow of fuel, there is a heat transfer which causes the pipes to have a cooler temperature than if no fuel were flowing. Thus, the cooler pipes which must be identified by those attempting to extinguish the fire will appear darker in the thermal imagery than those pipes and equipment in which the fuel flow has been stopped.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
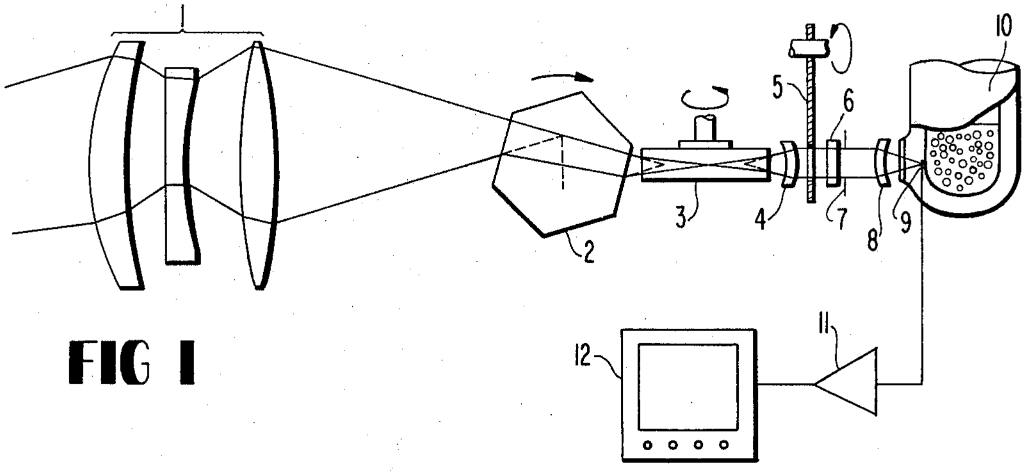
FIG. 1 illustrates the equipment used in the practice of the invention.

Referring to the drawings and more particularly to FIG. 1 thereof, an infrared camera is illustrated which comprises a three element objective lens system 1 which may be focused by means well known in the art. A virtual image is formed by the objective lens 1 on a plane within a vertical scanning prism 2. The image is scanned vertically by rotating the prism 2 about its horizontal axis. This results in a horizontal, virtual line-image being formed within a horizontal scanning prism 3. This line-image is then scanned horizontally by rotating prism 3 about its vertical axis. Typically, the vertical scanning prism 2 rotates at a relatively slow angular velocity on the order of 2 rps while the horizontal scanning prism 3 rotates at a relatively high angular velocity on the order of 200 rps.

The infrared rays from the image formed by the horizontal scanning prism 3 are columniated by a first columniating lens 4. The columniated infrared rays are periodically interrupted by rotary chopper disc 5 having apertures about its periphery. The periodically interrupted infrared rays then are selectively filtered by a "stacked filter" 6. The infrared rays passed by the stacked filter 6 pass through a selectable aperture 7 and are focused by a second columniating lens 8 onto an infrared detector 9. The infrared detector 9 is typically mounted in a Dewar flask 10 and cooled by liquid nitrogen.

The infrared flux from the optical-mechanical scanner comprising the prisms 2 and 3 impinging on the infrared detector 9 generates an electrical signal at the output of the detector. The amplitude of this signal varies according to the point-by-point temperature variation along the surface of the object that is being scanned by the camera. This voltage signal is amplified by a video preamplifier 11. The video preamplifier is of the type which is direct-coupled to retain the signal component which represents the absolute temperature level being sensed by the infrared detector 9. The amplifiedsignal from the preamplifier 11 is then coupled to a T.V. monitor unit 12. The signal is used to modulate the intensity of the electron beam of the T.V. monitor unit 12. The electron beam sweep is synchronized with the rotation of the scanning prisms 2 and 3 in a manner well known in the art.

Figure 2:
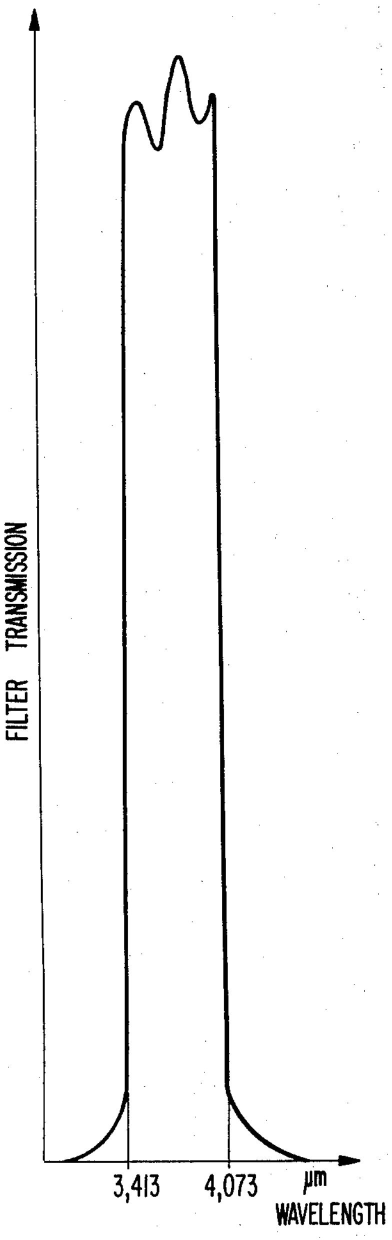
FIG. 2 is a graph illustrating the bandpass characteristics of one of the infrared filters employed in the equipment shown in FIG. 1.
Figure 3:
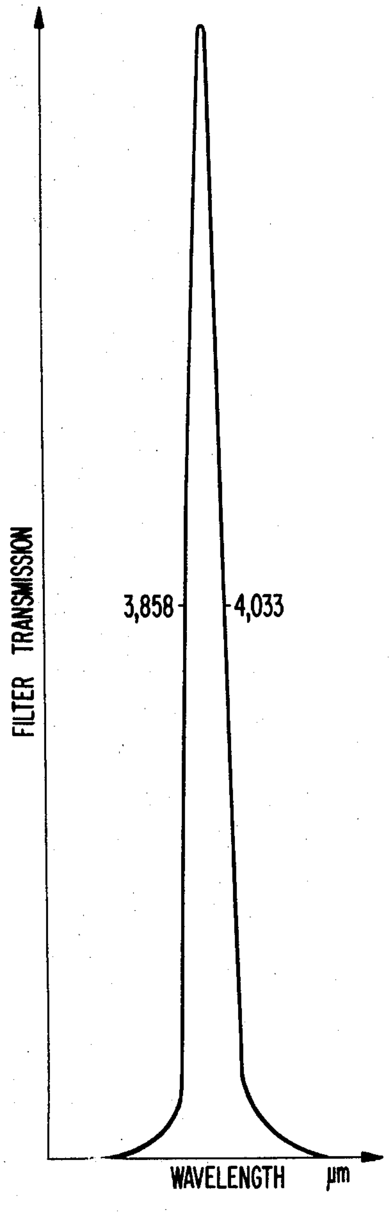
FIG. 3 is a graphical representation of the bandpass characteristics of the other infrared filter used in the equipment shown in FIG. 1.
Figure 4:
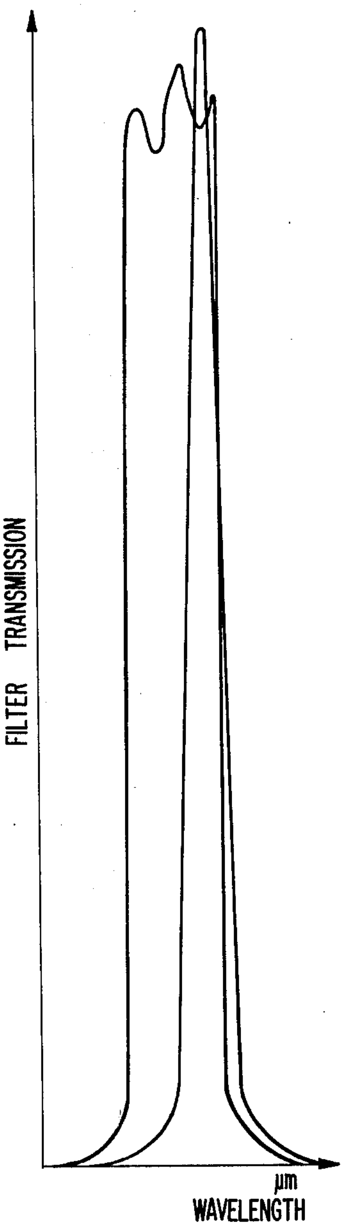
FIG. 4 is a composite graphical representation of the bandpass characteristics of the two filters used in the equipment of FIG. 1.

The bandpass characteristic of the first filter in the stacked filter 6 is illustrated in FIG. 2. Specifically, the bandpass is defined by a wave-length band of 3.413 to 4.073 μm. The second filer in the stacked filter 6 has a bandpass characteristic illustrated in FIG. 3. Specifically, the band-pass is defined as a wavelength band of 3.858 to 4.033 μm. These filters are preferably germanium oxide filters and are commercially available. FIG. 4 graphically illustrates the super position of the bandpass characteristics of the two filters comprising the stacked filter 6. This particular combination of filters has been empirically determined to provide the desired stable thermal imagery necessary for fast and accurate determination of which well is flowing in an oil well fire.

In the practice of the invention, the infrared camera illustrated generally in FIG. 1 is directed toward the flame front, and a visual thermal image is produced on the television screen of the T.V. monitor 12. The resulting stable thermal imagery can then be quickly and accurately analyzed to determine the temperatures of equipment engulfed in the fire. This stable imagery is produced because of the special filtering technique resulting from the use of the stacked filters 6. Because of the stable imagery produced, the invention permits a rapid and accurate determination of the source of fuel in the oil well fire so that the fire may be quickly extinguished thereby preventing the loss of considerable quantities of crude oil, natural gas and gas liquids.

It will be apparent that while the invention has been described in terms of a particular application using certain equipment, this description is only exemplary and various modifications can be made in practice within the scope of the invention as defined in the appended claims.

What is claimed is:

1. The method of producing stable infrared imagery by the use of infrared thermography for determining equipment temperatures in oil well fires comprising the steps of:

producing an infrared image of an oil well fire which is to be analyzed.

scanning the infrared image in two dimensions, selectively filtering the scanned infrared image by first passing the infrared rays from the scanned image within a first wavelength band and then passing the infrared rays from the scanned image within a second wavelength band, said second wavelength band being narrower than said first wavelength band and lying within said first wavelength band, and focusing the selectively filtered infrared image on an infrared detector to generate an electrical signal which varied according to the point-by-point temperature variation along the flame front of the oil well fire.

2. The method according to claim 1 further comprising the step of modulating the intensity of the electron beam of a T.V. monitor with the signal generated by the infrared detector to produce a visual display of the infrared image in real time.

3. The method according to claim 1 wherein the first wavelength band passed in the step of selectively filtering is about 3.4 to 4.1 μm.

4. The method according to claim 3 wherein the second wavelength band passed in the step of selectively filtering is about 3.8 to 4.1 μm.

5. The method of producing stable infrared imagery by the use of infrared thermography for determining equipment temperatures in oil well fires comprising the steps of:

producing an infrared image of an oil well fire which is to be analyzed, scanning the infrared image in two dimensions, selectively filtering the scanned infrared image by first passing the infrared rays from the scanned image within a first wavelength band of 3.413 to 4.073 μm and then passing the infrared rays from the scanned image within a second wavelength band between 3.858 to 4.033 μm, focusing the selectively filtered infrared image on an infrared detector to generate an electrical signal which varies according to the point-by-point temperature variation along the flame front of the oil well fire, and modulating the intensity of the electron beam of a T.V. monitor to produce a stable visual image in real time.

* * * * *